(12) United States Patent

Du et al.

(10) Patent No.: US 12,647,542 B2

(45) Date of Patent: Jun. 2, 2026

(54) COLOR CORRECTION METHOD FOR LIGHTING SYSTEM AND LIGHTING SYSTEM

(71) Applicant: APPOTRONICS CORPORATION LIMITED, Guangdong (CN)

(72) Inventors: Peng Du, Guangdong (CN); Zuqiang Guo, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 778 days.

(21) Appl. No.: 17/627,625

(22) PCT Filed: Jun. 28, 2020

(86) PCT No.: PCT/CN2020/098520

§ 371 (c)(1),
(2) Date: Oct. 18, 2023

(87) PCT Pub. No.: WO2021/008333

PCT Pub. Date: Jan. 21, 2021

(65) Prior Publication Data

US 2024/0121368 A1     Apr. 11, 2024

(30) Foreign Application Priority Data

Jul. 16, 2019    (CN) .......................... 201910640026.5

(51) Int. Cl.
*G03B 21/20*     (2006.01)
*H04N 9/31*      (2006.01)

(52) U.S. Cl.
CPC ................................... *H04N 9/312* (2013.01)

(58) Field of Classification Search
CPC ................ H04N 9/312; G03B 21/2013; G03B 21/2053; G03B 21/206; G03B 33/08; G03B 33/12; G03B 21/204
See application file for complete search history.

(56) References Cited

U.S. PATENT DOCUMENTS 9,904,160 B2    2/2018  Hu et al.
2009/0128717 A1   5/2009  Nagashima
(Continued)

FOREIGN PATENT DOCUMENTS

CN     102749797 A    10/2012
CN     104321686 A    1/2015
(Continued)

OTHER PUBLICATIONS

Chinese Office Action Second Review Opinion Notice dated Jul. 12, 2023 for corresponding CN Application No. 2019106400265.
(Continued)

*Primary Examiner* — Howard D Brown, Jr.
(74) *Attorney, Agent, or Firm* — Tarolli, Sundheim, Covell & Tummino LLP

(57)     ABSTRACT

Disclosed are a color correction method for a lighting system and a lighting system, the lighting system includes a first laser set (10), a second laser set (20), a driving assembly (30), a wavelength conversion device (40), and a light-combining assembly (50), where the first laser set (10) is used for emitting first primary light; the second laser set (20) is used for emitting second primary light; the driving assembly (30) is used for driving the first laser set (10) to emit the first primary light in a first timing sequence and a second timing sequence, and driving the second laser set (20) to emit the second primary light in the first timing sequence and the second timing sequence; the wavelength conversion device (40) is used for converting the first primary light into converted light in the second timing sequence; and the (Continued)

light-combining assembly (50) is used for combining the first primary light and the second primary light in the first timing sequence, and combining the second primary light and the converted light in the second timing sequence. By means of the above method, the first primary light and the second primary light are combined, such that correction of the first primary light is realized to enable the first primary light to meet a preset color standard.

12 Claims, 11 Drawing Sheets

(56) References Cited

U.S. PATENT DOCUMENTS

| | | | | |
|---|---|---|---|---|
| 2011/0043764 | A1 | 2/2011 | Narikawa | |
| 2018/0231883 | A1* | 8/2018 | Hu | G03B 21/28 |
| 2019/0037185 | A1* | 1/2019 | Tarpan | H04N 9/3182 |
| 2020/0110329 | A1* | 4/2020 | Hu | G03B 21/204 |
| 2020/0192204 | A1* | 6/2020 | Tarpan | G03B 21/204 |
| 2020/0218142 | A1* | 7/2020 | Vetsuypens | G03B 21/2033 |
| 2020/0233290 | A1* | 7/2020 | Hsu | G03B 21/206 |
| 2022/0197126 | A1* | 6/2022 | Hu | G03B 21/208 |

FOREIGN PATENT DOCUMENTS

| | | | |
|---|---|---|---|
| CN | 101435916 | A | 6/2015 |
| CN | 104685400 | A | 6/2015 |
| CN | 204595412 | U | 8/2015 |
| CN | 105629486 | A | 6/2016 |
| CN | 109426051 | A | 3/2019 |
| CN | 208969415 | U | 6/2019 |
| DE | 102014210389 | A1 | 12/2015 |
| EP | 3282317 | A1 | 2/2018 |
| JP | 2017017698 | A | 1/2017 |

OTHER PUBLICATIONS

European Search Report for Corresponding Application Serial No. 20839766.1, Dated Jul. 7, 2022.

International Search Report dated Sep. 28, 2020 for corresponding International Application No. PCT/CN2020/098520.

Chinese Office Action dated Mar. 23, 2023 for corresponding CN Application No. 2019106400265.

\* cited by examiner

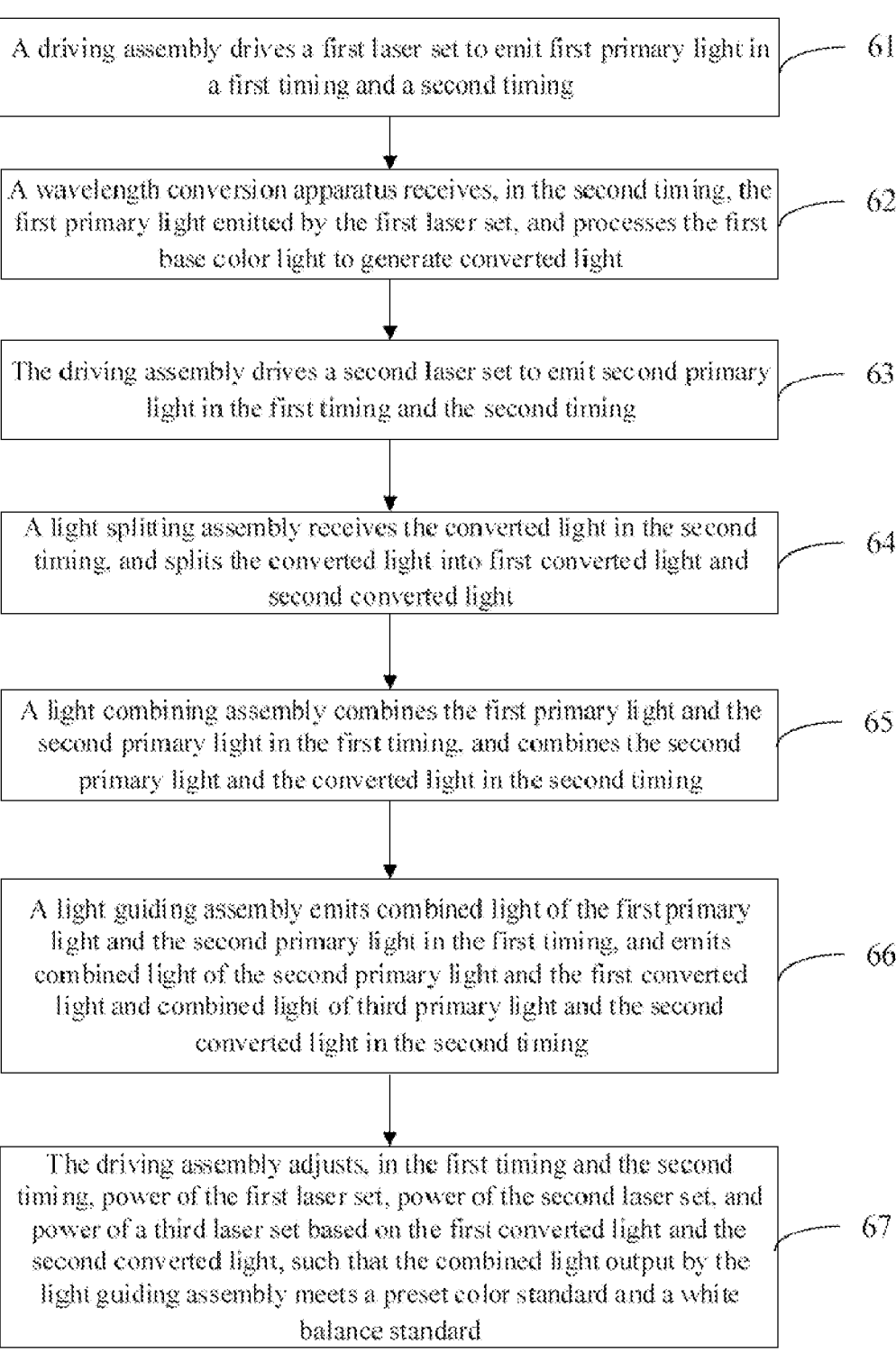

A driving assembly drives a first laser set to emit first primary light in a first timing and a second timing ⟍ 61

A wavelength conversion apparatus receives, in the second timing, the first primary light emitted by the first laser set, and processes the first base color light to generate converted light ⟍ 62

The driving assembly drives a second laser set to emit second primary light in the first timing and the second timing ⟍ 63

A light splitting assembly receives the converted light in the second timing, and splits the converted light into first converted light and second converted light ⟍ 64

A light combining assembly combines the first primary light and the second primary light in the first timing, and combines the second primary light and the converted light in the second timing ⟍ 65

A light guiding assembly emits combined light of the first primary light and the second primary light in the first timing, and emits combined light of the second primary light and the first converted light and combined light of third primary light and the second converted light in the second timing ⟍ 66

The driving assembly adjusts, in the first timing and the second timing, power of the first laser set, power of the second laser set, and power of a third laser set based on the first converted light and the second converted light, such that the combined light output by the light guiding assembly meets a preset color standard and a white balance standard ⟍ 67

Fig. 6

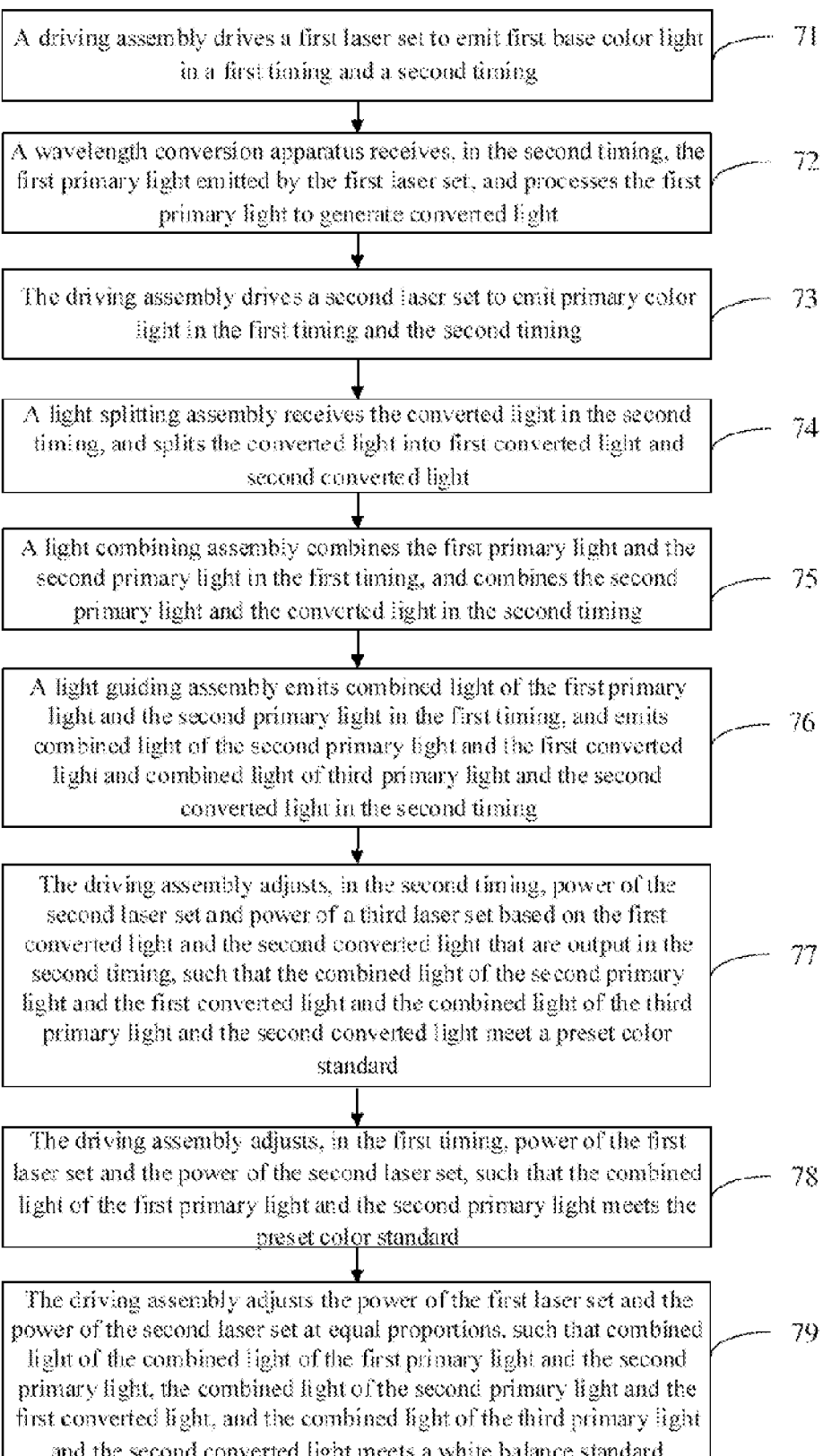

A driving assembly drives a first laser set to emit first base color light in a first timing and a second timing — 71

A wavelength conversion apparatus receives, in the second timing, the first primary light emitted by the first laser set, and processes the first primary light to generate converted light — 72

The driving assembly drives a second laser set to emit primary color light in the first timing and the second timing — 73

A light splitting assembly receives the converted light in the second timing, and splits the converted light into first converted light and second converted light — 74

A light combining assembly combines the first primary light and the second primary light in the first timing, and combines the second primary light and the converted light in the second timing — 75

A light guiding assembly emits combined light of the first primary light and the second primary light in the first timing, and emits combined light of the second primary light and the first converted light and combined light of third primary light and the second converted light in the second timing — 76

The driving assembly adjusts, in the second timing, power of the second laser set and power of a third laser set based on the first converted light and the second converted light that are output in the second timing, such that the combined light of the second primary light and the first converted light and the combined light of the third primary light and the second converted light meet a preset color standard — 77

The driving assembly adjusts, in the first timing, power of the first laser set and the power of the second laser set, such that the combined light of the first primary light and the second primary light meets the preset color standard — 78

The driving assembly adjusts the power of the first laser set and the power of the second laser set at equal proportions, such that combined light of the combined light of the first primary light and the second primary light, the combined light of the second primary light and the first converted light, and the combined light of the third primary light and the second converted light meets a white balance standard — 79

Fig. 7

| Timing | B | Y | B | Y |
|--------|-----|-----|-----|-----|

| BLD | B1 | B2 | B1 | B2 |
|-----|-----|-----|-----|-----|

| GLD | G1 | G2 | G1 | G2 |
|-----|-----|-----|-----|-----|

| RLD | | R | | R |
|-----|--|---|--|---|

FIG. 8

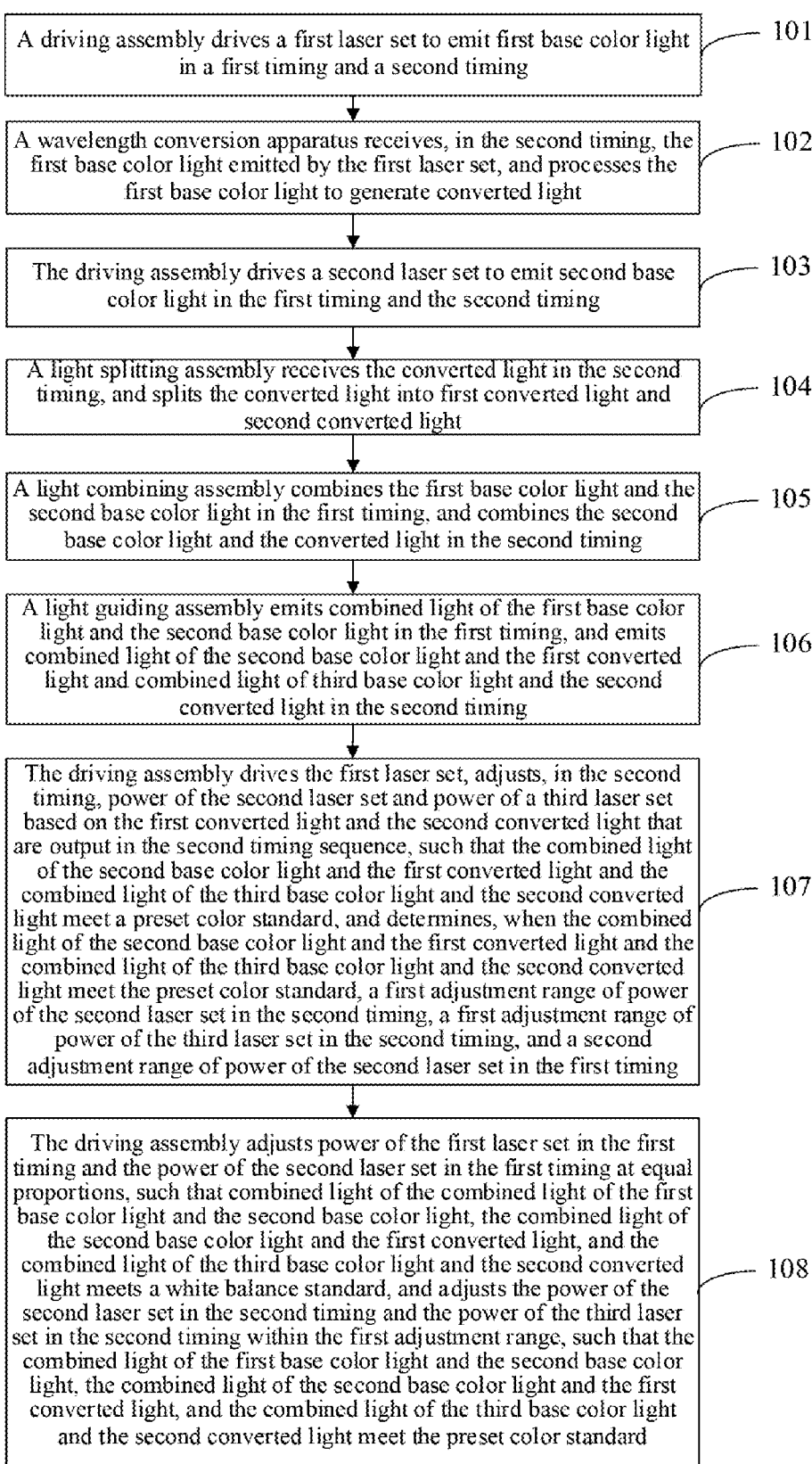

A driving assembly drives a first laser set to emit first base color light in a first timing and a second timing — 101

A wavelength conversion apparatus receives, in the second timing, the first base color light emitted by the first laser set, and processes the first base color light to generate converted light — 102

The driving assembly drives a second laser set to emit second base color light in the first timing and the second timing — 103

A light splitting assembly receives the converted light in the second timing, and splits the converted light into first converted light and second converted light — 104

A light combining assembly combines the first base color light and the second base color light in the first timing, and combines the second base color light and the converted light in the second timing — 105

A light guiding assembly emits combined light of the first base color light and the second base color light in the first timing, and emits combined light of the second base color light and the first converted light and combined light of third base color light and the second converted light in the second timing — 106

The driving assembly drives the first laser set, adjusts, in the second timing, power of the second laser set and power of a third laser set based on the first converted light and the second converted light that are output in the second timing sequence, such that the combined light of the second base color light and the first converted light and the combined light of the third base color light and the second converted light meet a preset color standard, and determines, when the combined light of the second base color light and the first converted light and the combined light of the third base color light and the second converted light meet the preset color standard, a first adjustment range of power of the second laser set in the second timing, a first adjustment range of power of the third laser set in the second timing, and a second adjustment range of power of the second laser set in the first timing — 107

The driving assembly adjusts power of the first laser set in the first timing and the power of the second laser set in the first timing at equal proportions, such that combined light of the combined light of the first base color light and the second base color light, the combined light of the second base color light and the first converted light, and the combined light of the third base color light and the second converted light meets a white balance standard, and adjusts the power of the second laser set in the second timing and the power of the third laser set in the second timing within the first adjustment range, such that the combined light of the first base color light and the second base color light, the combined light of the second base color light and the first converted light, and the combined light of the third base color light and the second converted light meet the preset color standard — 108

Fig. 10

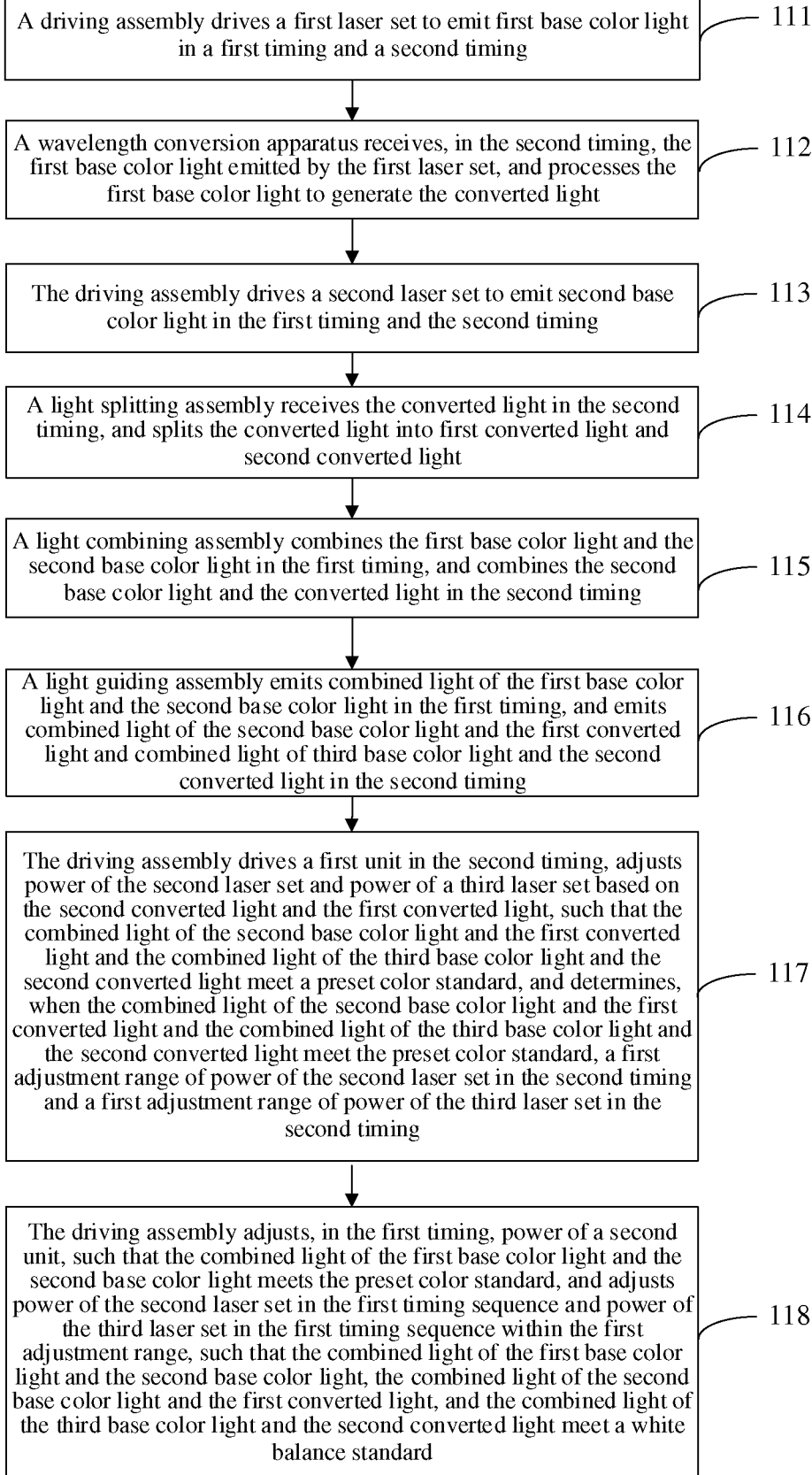

A driving assembly drives a first laser set to emit first base color light in a first timing and a second timing — 111

A wavelength conversion apparatus receives, in the second timing, the first base color light emitted by the first laser set, and processes the first base color light to generate the converted light — 112

The driving assembly drives a second laser set to emit second base color light in the first timing and the second timing — 113

A light splitting assembly receives the converted light in the second timing, and splits the converted light into first converted light and second converted light — 114

A light combining assembly combines the first base color light and the second base color light in the first timing, and combines the second base color light and the converted light in the second timing — 115

A light guiding assembly emits combined light of the first base color light and the second base color light in the first timing, and emits combined light of the second base color light and the first converted light and combined light of third base color light and the second converted light in the second timing — 116

The driving assembly drives a first unit in the second timing, adjusts power of the second laser set and power of a third laser set based on the second converted light and the first converted light, such that the combined light of the second base color light and the first converted light and the combined light of the third base color light and the second converted light meet a preset color standard, and determines, when the combined light of the second base color light and the first converted light and the combined light of the third base color light and the second converted light meet the preset color standard, a first adjustment range of power of the second laser set in the second timing and a first adjustment range of power of the third laser set in the second timing — 117

The driving assembly adjusts, in the first timing, power of a second unit, such that the combined light of the first base color light and the second base color light meets the preset color standard, and adjusts power of the second laser set in the first timing sequence and power of the third laser set in the first timing sequence within the first adjustment range, such that the combined light of the first base color light and the second base color light, the combined light of the second base color light and the first converted light, and the combined light of the third base color light and the second converted light meet a white balance standard — 118

FIG. 11

COLOR CORRECTION METHOD FOR LIGHTING SYSTEM AND LIGHTING SYSTEM

CROSS-REFERENCE TO RELATED APPLICATIONS

Related Applications

The present application is a Continuation-in-part of PCT Application Serial No. PCT/CN2020/098520, filed on 28 Jun. 2020; which claims priority to Chinese Patent Application No. 201910640026.5, filed on Jul. 16, 2019, the contents of which are incorporated herein by reference in their entirety.

TECHNICAL FIELD

The present application relates to the field of projection technologies, and specifically, to a color correction method for a lighting system and a lighting system.

BACKGROUND

Most traditional light sources use xenon lights as light source. The xenon light has a short service life, which is usually only about one month in the case of full-power output. Therefore, a bulb of xenon light source needs to be replaced frequently, which has certain impact on normal projection of a cinema. Owing to advantages such as a color and a service life, a laser light source has been developed continuously in the cinema market in recent years and has gradually replaced the bulb light source.

SUMMARY

This application is intended to provide a color correction method for a projection apparatus and a projection apparatus, to correct a first primary color by combining first primary light and second primary light, such that the first primary color meets a preset color standard.

To resolve the above technical problem, a technical solution adopted in this application is as follows: A lighting system is provided. The lighting system includes a first laser set, a second laser set, a driving assembly, a wavelength conversion device, and a light-combining assembly, where the first laser set is configured to emit first primary light; the second laser set is configured to emit second primary light; the driving assembly is configured to drive the first laser set to emit the first primary light in a first timing and a second timing, and drive the second laser set to emit the second primary light in the first timing and the second timing; the wavelength conversion device is configured to convert the first primary light into converted light in the second timing; and the light-combining assembly is configured to combine the first primary light and the second primary light in the first timing, and combine the second primary light and the converted light in the second timing.

Furthermore, a color correction method for a lighting system is provided. The method is applied to a lighting system, and the lighting system includes a first laser set, a second laser set, a wavelength conversion device, a driving assembly, and a light-combining assembly. The method is based on the driving assembly, and includes: driving, by the driving assembly, the first laser set to emit first primary light in a first timing and a second timing; converting, by the wavelength conversion device, the first primary light into converted light in the second timing; driving, by the driving assembly, the second laser set to emit second primary light in the first timing and the second timing; and combining, by the light-combining assembly, the first primary light and the second primary light in the first timing, and combining the second primary light and the converted light in the second timing.

BRIEF DESCRIPTION OF THE DRAWINGS

To describe the technical solutions in the embodiments of the present application more clearly, the drawings required to describe the embodiments are briefly described below. Apparently, the drawings described below are only some embodiments of the present application. Those of ordinary skill in the art may further obtain other drawings based on these drawings without creative efforts. In the drawings:

FIG. 6 is a schematic flowchart of a color correction method for a lighting system according to a second embodiment of the present application;

FIG. 7 is a schematic flowchart of a color correction method for a lighting system according to a third embodiment of the present application;

FIG. 8 is a schematic diagram of a timing and a driving current in the embodiment shown in FIG. 7;

FIG. 10 is a schematic flowchart of a color correction method for a lighting system according to a fourth embodiment of the present application;

FIG. 11 is a schematic flowchart of a color correction method for a lighting system according to a fifth embodiment of the present application.

DETAILED DESCRIPTION

A light source of a traditional cinema uses a three-chip spatial light modulator White illumination light is split through space. For each spatial light modulator, illumination light is output constantly, and the bulb light source has a constant spectrum and is driven by a set of power supplies. Therefore, a commonly used color correction method is to calibrate white balance by adjusting a light output of the spatial light modulator. However, for a single primary color, better calibration cannot be achieved. The laser light source is laser light with different wavelengths or a laser-excited mixed light source. Different lasers have output power and wavelength tolerances, and coating characteristics of optical parts are different for different batches. Therefore, three primary colors and white balance displayed by a projector are different. Therefore, a projection device using the laser light source needs to adjust the white balance and correct the three primary colors.

Figure 1:
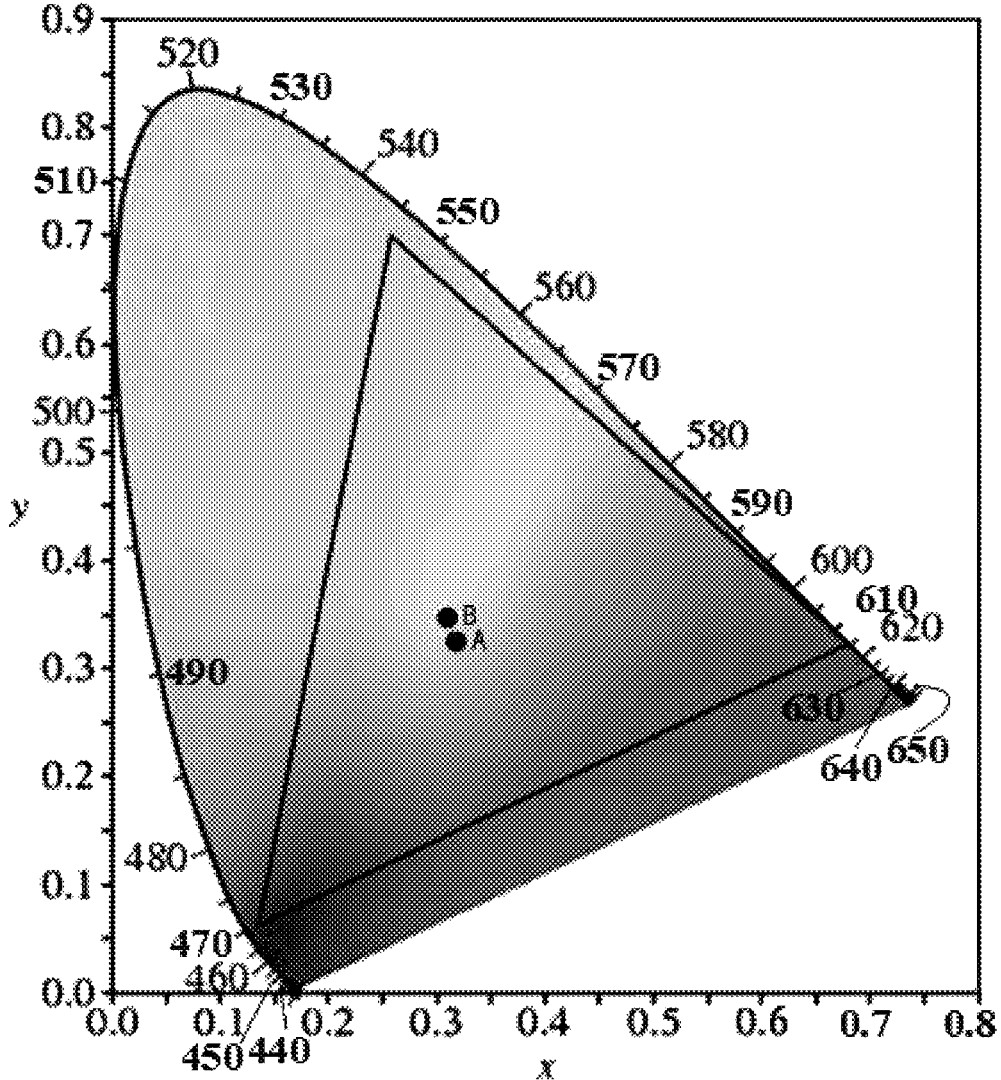
FIG. 1 is a color gamut diagram in the prior art.

When an optical-mechanical structure with a two-chip spatial light modulator is adopted, light sources of different individual lasers are different. Therefore, an output color needs to be corrected. Since an optical machine adopts a two-chip spatial light modulator, at least one spatial light modulator needs to modulate two kinds of primary light. Compared with a system with the three-chip spatial light modulator, the time for modulating each primary color is greatly shortened. Therefore, color correction by adjusting a light output of the spatial light modulator greatly affects a gray scale of a primary color and sacrifices brightness. As shown in FIG. 1, in a CIE1931 chromaticity coordinate system, if an actual white light coordinate point B of the projector deviate from a standard white light coordinate point A and is above the standard white light coordinate point A, it indicates that a proportion of green light in the white light coordinate point B is greater than that in the white light coordinate point A. Therefore, it is necessary to reduce a light output of a green-light spatial light modulator, reduce the proportion of the green light, and make white light color coordinates close to the point A. However, the green light plays a major role in output brightness of the projector, such that this white balance correction scheme sacrifices the output brightness of the projector.

The technical solutions in the embodiments of the present application are clearly and completely described below with reference to the accompanying drawings in the embodiments of the present application. Apparently, the described embodiments are merely some rather than all of the embodiments of the present application. All other embodiments obtained by those of ordinary skill in the art based on the embodiments of the present application without creative efforts should fall within the protection scope of the present application.

Figure 2:
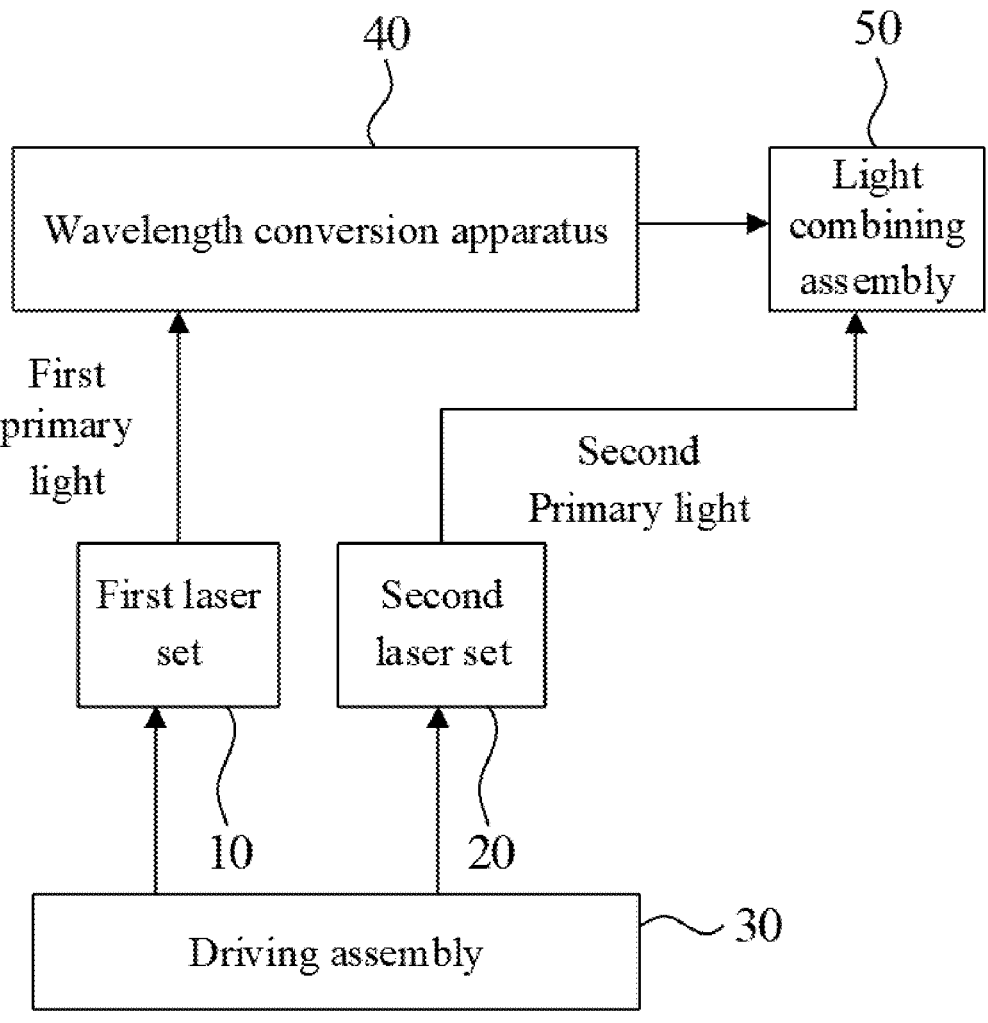
FIG. 2 is a schematic structural diagram of a lighting system according to an embodiment of the present application.

Referring to FIG. 2, FIG. 2 is a schematic structural diagram of a lighting system according to an embodiment of the present application. The lighting system includes a first laser set 10, a second laser set 20, a driving assembly 30, a wavelength conversion device 40, and a light-combining assembly 50.

The first laser set 10 and the second laser set 20 are configured to generate primary light. Specifically, the first laser set 10 is configured to emit first primary light, and the second laser set 20 is configured to emit second primary light. In a specific embodiment, the first laser set 10 and the second laser set 20 may be blue laser diodes (BLDs) and green laser diodes (GLDs) respectively. In other embodiments, the second laser set 20 may alternatively be red laser diodes (RLDs) or a combination of a GLD and an RLD.

The driving assembly 30 is configured to drive the first laser set 10 to emit the first primary light in a first timing and a second timing, and drive the second laser set 20 to emit the second primary light in the first timing and the second timing. The first timing and the second timing are continuous timings and are alternately and periodically arranged. The driving assembly 30 can drive the first laser set 10 and the second laser set 20 independently.

The wavelength conversion device 40 is configured to convert the first primary light into converted light in the second timing. Specifically, the wavelength conversion device 40 receives the first primary light emitted by the first laser set 10, and processes the first primary light to generate the converted light. A first primary color may be blue.

The light-combining assembly 50 is configured to combine the first primary light and the second primary light in the first timing, and combine the second primary light and the converted light in the second timing. Specifically, the light-combining assembly 50 receives the converted light that is transmitted from the wavelength conversion device 40, the first primary light and the second primary light emitted by the second laser set 20, and emits combined light of the converted light and the second primary light and combined light of the first primary light and the second primary light.

During color calibration, the driving assembly 30 can adjust power of the first laser set 10 and power of the second laser set 20, such that the combined light, output by the light-combining assembly 50, of the first primary light and the second primary light meets a preset color standard. Specifically, the driving assembly 30 may be a driving power supply. The driving assembly 30 changes driving power input to the first laser set 10 and driving power input to the second laser set 20 by adjusting currents or voltages that are input to the first laser set 10 and the second laser set 20, or adjusting both the currents and the voltages that are input to the first laser set 10 and the second laser set 20.

In addition, when the first primary light is corrected, only a small amount of second primary light is mixed, provided that color coordinates of the combined light of the first primary light and the second primary light meet the preset color standard. For example, the first primary light is blue light, the second primary light is green light, and a proportion of the green light in the emitted blue light may be 10%, 15%, 20%, 30%, or the like.

Different from the prior art, this embodiment provides the lighting system. When performing color calibration, the driving assembly 30 can adjust the power input to the first laser set 10 and the power input to the second laser set 20, so as to adjust brightness and a proportion of light. The first primary color can be adjusted by mixing the second primary light and the first primary light, to correct the first primary color, such that color coordinates of the first primary color meet the color standard.

Figure 3:
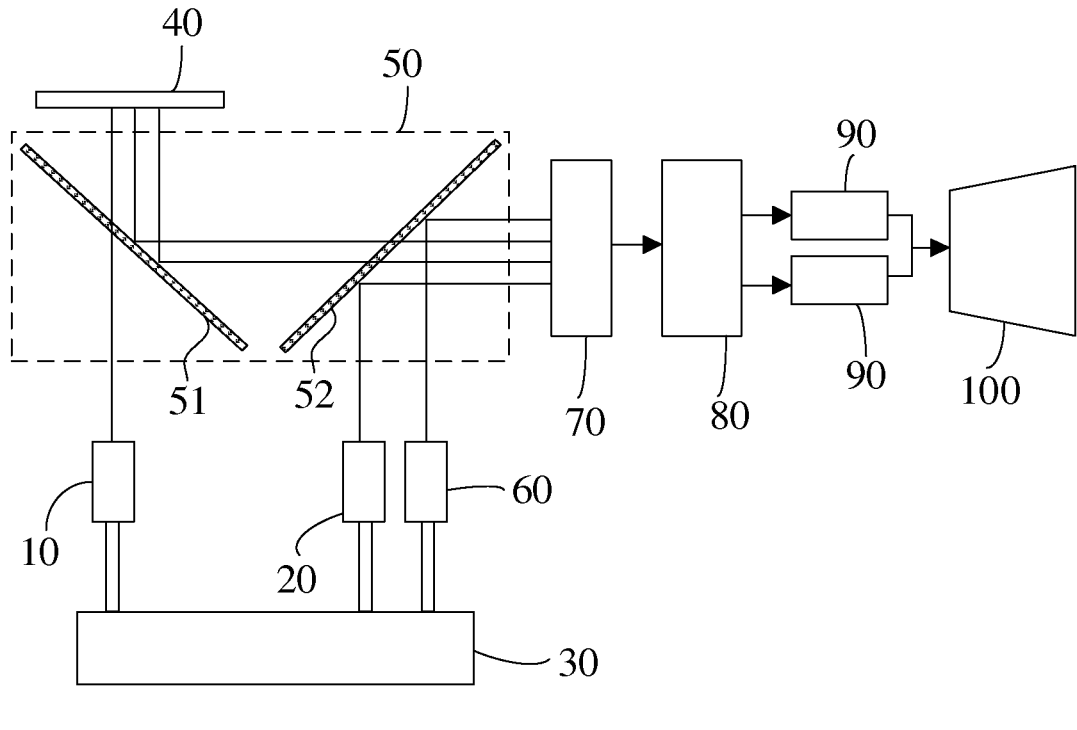
FIG. 3 is a schematic structural diagram of a lighting system according to another embodiment of the present application.
Figure 4:
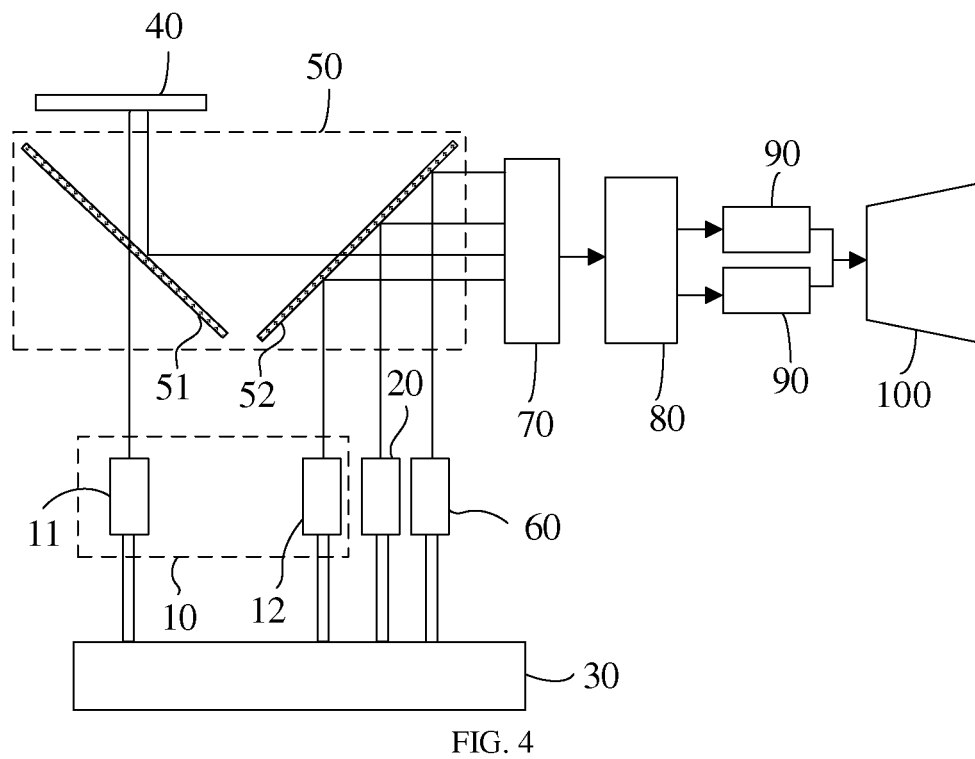
FIG. 4 is a schematic structural diagram of a lighting system according to still another embodiment of the present application.

Referring to FIG. 3 and FIG. 4, FIG. 3 is a schematic structural diagram of a lighting system according to another embodiment of the present application, and FIG. 4 is a schematic structural diagram of a lighting system according to still another embodiment of the present application. The lighting system includes a first laser set 10, a second laser set 20, a driving assembly 30, a wavelength conversion device 40, a light-combining assembly 50, a third laser set 60, a light splitting assembly 70, and a light guiding assembly 80.

The driving assembly 30 adjusts optical power of the second laser set 20 in a first timing and a second timing separately, such that power of second primary light emitted in the first timing is different from that of second primary light emitted in the second timing.

The wavelength conversion device 40 is disposed on an optical path of first primary light, and configured to convert the first primary light into converted light in the second timing. Specifically, the wavelength conversion device 40 may be a fluorescent wheel, the first primary light is blue laser light, the fluorescent wheel is provided with a fluorescent substance, and the blue laser light is used to excite the fluorescent substance to generate the converted light.

The third laser set 60 is configured to generate third primary light. Specifically, the first laser set 10, the second laser set 20, and the third laser set 60 are BLDs, GLDs, and RLDs respectively.

The light-combining assembly 50 includes a first reflection and transmission assembly 51 and a second reflection and transmission assembly 52. In an embodiment, the first reflection and transmission assembly 51 is disposed on the optical path of the first primary light, and includes a reflection area and a transmission area (not shown in the figure). The transmission area is used to transmit the first primary light, and the reflection area is used to reflect the converted light to the second reflection and transmission assembly 52. The second reflection and transmission assembly 52 is disposed on an optical path of the converted light, and includes a reflection area and a transmission area (not shown in the figure). The transmission area is used to transmit the converted light, and the reflection area is used to reflect, to the light splitting assembly 70, the second primary light output by the second laser set 20 and the third primary light output by the third laser set 60.

The light splitting assembly 70 performs color separation on the incident light and emits light to the light guiding assembly 80. Specifically, the light splitting assembly 70 is disposed on the optical path of the converted light, receives the converted light in the second timing, and divides the converted light into first converted light and second converted light. Specifically, the converted light is yellow light, and the first converted light and the second converted light are green light and red light respectively.

The light guiding assembly 80 emits combined light of the first primary light and the second primary light in the first timing, and emits combined light of the second primary light and the first converted light and combined light of the third primary light and the second converted light in the second timing.

Referring to FIG. 3, the lighting system further includes at least two spatial light modulators 90 disposed on an optical path of the combined light output by the light guiding assembly 80, and a projection lens 100. The spatial light modulators 90 are disposed before the projection lens 100 and each are configured to modulate, based on a received image signal, the light output by the light guiding assembly 80, and transmit modulated light to the projection lens 100 for projection imaging. Specifically, image light output by the spatial light modulators 90 can be imaged by the projection lens 100 on a screen after being mixed.

In a specific embodiment, as shown in FIG. 3, after receiving laser light emitted by the first laser set 10, the wavelength conversion device 40 converts the laser light into the converted light in time sequence. Specifically, the fluorescent wheel is provided with a reflection area and a wavelength conversion area (not shown in the figure). The reflection area of the fluorescent wheel is used to reflect the laser light to the reflection area of the first reflection and transmission assembly 51. The wavelength conversion area is provided with a fluorescent substance, and the blue laser light generated by the first laser set 10 is irradiated to the fluorescent substance to excite the fluorescent substance to generate fluorescent light. The wavelength conversion device 40 generates the blue laser light and yellow fluorescent light in time sequence, and the blue laser light and the yellow fluorescent light enter the light splitting assembly 70 in time sequence. The first converted light and the second converted light are green fluorescent light and red fluorescent light respectively.

The driving assembly 30 can adjust, in the first timing and the second timing, power of the first laser set 10, power of the second laser set 20, and power of the third laser set 60 based on the first converted light and the second converted light, such that the combined light output by the light guiding assembly 80 meets a preset color standard and a white balance standard.

In another specific embodiment, as shown in FIG. 4, the first laser set 10 includes a first unit 11 and a second unit 12.

The first unit 11 and the second unit 12 are respectively configured to generate the first primary light in the first timing and the second timing, and the first primary light emitted by the first unit 11 has a different wavelength range from that emitted by the second unit 12. For example, the first unit 11 may emit 455 nm blue laser light, and the second unit 12 may emit 465 nm blue laser light. In other embodiments, the first unit 11 and the second unit 12 may emit blue laser light of other wavelength ranges, and specific wavelengths are not limited herein.

After receiving the laser light emitted by the first unit 11, the wavelength conversion device 40 converts the laser light into the converted light. After receiving the light emitted by the second unit 12, the second reflection and transmission assembly 52 is further configured to reflect the light to the light splitting assembly 70. The light emitted by the second unit 12 is also blue laser light.

Green light can be corrected by mixing the green laser light and the green fluorescent light, red primary light can be corrected by mixing red laser light and the red fluorescent light, and blue primary light can be corrected by mixing the blue laser light and the green laser light, thereby improving utilization efficiency of the green laser light. In this way, three primary colors and white balance of a projector can be corrected without losing a luminous flux, such that the colors of the three primary colors and white balance meet the preset color standard and the white balance standard respectively.

Figure 5:
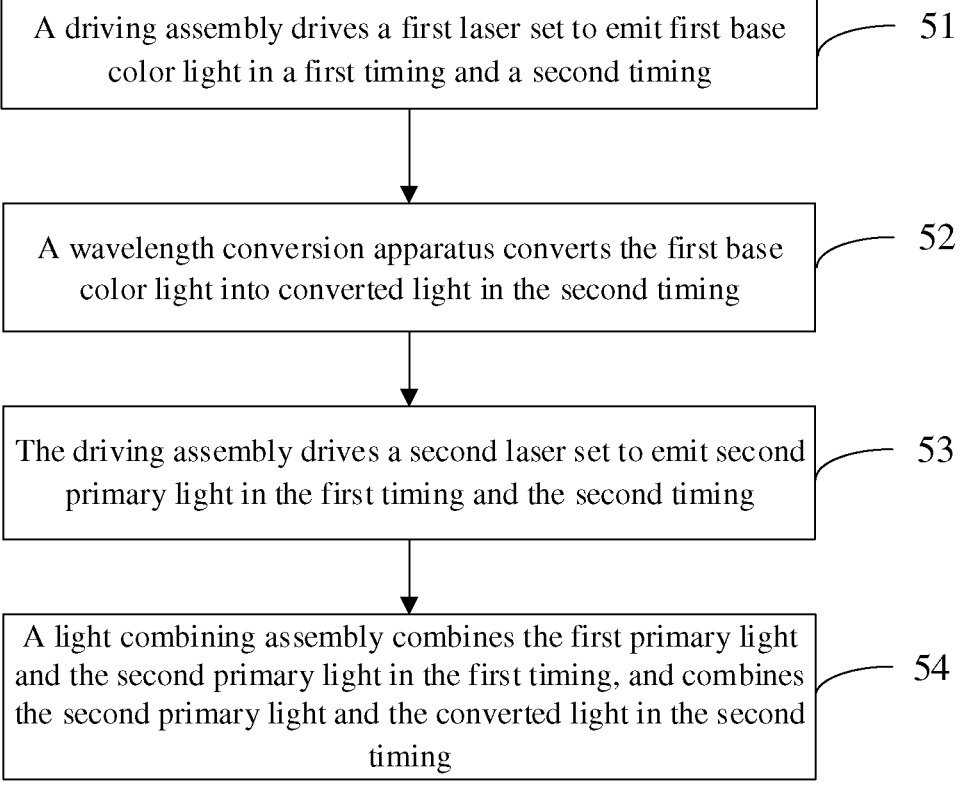
FIG. 5 is a schematic flowchart of a color correction method for a lighting system according to a first embodiment of the present application.

Referring to FIG. 2 and FIG. 5, FIG. 5 is a schematic flowchart of a color correction method for a lighting system according to a first embodiment of the present application. The lighting system includes at least a first laser set 10, a second laser set 20, a driving assembly 30, a wavelength conversion device 40, and a light-combining assembly 50. The method is based on the driving assembly 30, and includes the following steps.

Step 51: The driving assembly drives the first laser set to emit first primary light in a first timing and a second timing.

Step 52: The wavelength conversion device converts the first primary light into converted light in the second timing.

The driving assembly 30 drives the first laser set 10 to generate the first primary light.

The first laser set 10 makes the first primary light incident into the wavelength conversion device 40. The wavelength conversion device 40 processes the incident first primary light to generate the converted light.

Step 53: The driving assembly drives the second laser set to emit second primary light in the first timing and the second timing.

The driving assembly 30 drives the first laser set 10 and the second laser set 20 separately, such that the second laser set 20 generates the second primary light.

Step 54: The light-combining assembly combines the first primary light and the second primary light in the first timing, and combines the second primary light and the converted light in the second timing.

In a specific embodiment, the first primary light may be blue primary light, and the driving assembly 30 adjusts power input to the first laser set 10 and power input to the second laser set 20, such that color coordinates of blue primary light output by the light-combining assembly 50 meet a standard for a blue primary color in a preset color standard. The preset color standard may be the DCI-P3 standard, and the standard for a blue primary color may be (0.15+0.01/−0.03, 0.06+0.02/−0.04).

Different from the prior art, this embodiment provides the color correction method for a lighting system. The driving assembly 30 drives the first laser set 10 and the second laser set 20 to generate the first primary light and the second primary light respectively. The wavelength conversion device 40 converts the first primary light into the converted light in the second timing. The driving assembly 30 adjusts the power input to the first laser set 10 and the power input to the second laser set 20, to adjust brightness of the second primary light and a proportion of the second primary light in the combined light, so as to correct a first primary color, such that color coordinates of the first primary color meet the color standard.

Referring to FIG. 3 and FIG. 6, FIG. 6 is a schematic flowchart of a color correction method for a lighting system according to a second embodiment of the present application. The lighting system further includes a third laser set 60, a light splitting assembly 70, and a light guiding assembly 80. The third laser set 60 is configured to generate third primary light, and the method includes the following steps.

Step 61: A driving assembly drives a first laser set to emit first primary light in a first timing and a second timing.

Step 62: A wavelength conversion device receives, in the second timing, the first primary light emitted by the first laser set, and processes the first primary light to generate converted light.

The first primary light is laser light. In the second timing, the wavelength conversion device 40 receives the laser light. Under the action of the laser light, a fluorescent substance on the wavelength conversion device 40 is excited to produce yellow fluorescent light.

Step 63: The driving assembly drives a second laser set to emit second primary light in the first timing and the second timing.

Step 64: The light splitting assembly receives the converted light in the second timing, and splits the converted light into first converted light and second converted light.

In the second timing, the light splitting assembly 70 performs color separation on the converted light output by the wavelength conversion device 40 to generate the first converted light and the second converted light. Specifically, the light splitting assembly 70 divides the yellow fluorescent light into red fluorescent light and green fluorescent light.

Step 65: A light-combining assembly combines the first primary light and the second primary light in the first timing, and combines the second primary light and the converted light in the second timing.

Step 66: The light guiding assembly emits combined light of the first primary light and the second primary light in the first timing, and emits combined light of the second primary light and the first converted light and combined light of the third primary light and the second converted light in the second timing.

Step 67: The driving assembly adjusts, in the first timing and the second timing, power of the first laser set, power of the second laser set, and power of the third laser set based on the first converted light and the second converted light, such that the combined light output by the light guiding assembly meets a preset color standard and a white balance standard.

The driving assembly 30 drives the second laser set 20 and the third laser set 60 separately, such that the second laser set 20 and the third laser set 60 generate the second primary light and the third primary light respectively. The first primary light, the second primary light, and the third primary light may be blue primary light, green primary light, and red primary light respectively.

The driving assembly 30 adjusts the power input to the first laser set 10, the power input to the second laser set 20, and the power input to the third laser set 60. Specifically, the driving assembly 30 adjusts, in the first timing, voltages and/or currents that are input to the first laser set 10 and the second laser set 20, and adjusts, in the second timing, voltages and/or currents that are input to the first laser set 10, the second laser set 20, and the third laser set 60, such that color coordinates of blue primary light output by the light guiding assembly 80 meet a standard for a blue primary color in the preset color standard, color coordinates of red primary light output by the light guiding assembly 80 meet a standard for a red primary color in the preset color standard, and color coordinates of green primary light output by the light guiding assembly 80 meet a standard for a green primary color in the preset color standard; and adjusts proportions of the blue primary light, the green primary light, and the red primary light, so as to white balance calibration. Specifically, the standard for a red primary color may be (0.68=0.01, 0.32=0.01), the standard for a green primary color may be (0.265+0.02, 0.69+0.02), and the balance calibration may be (0.314+0.006, 0.351=0.006).

The power input to the first laser set 10, the power input to the second laser set 20, and the power input to the third laser set 60 are adjusted by the driving assembly 30. Brightness and a proportion of light can be adjusted by the driving assembly 30 to correct a color, such that color coordinates of three primary colors meet the color standard and the white balance standard.

Referring to FIG. 3 and FIG. 7, FIG. 7 is a schematic flowchart of a color correction method for a lighting system according to a third embodiment of the present application. The method includes the following steps.

Step 71: A driving assembly drives a first laser set to emit first primary light in a first timing and a second timing.

Step 72: A wavelength conversion device receives, in the second timing, the first primary light emitted by the first laser set, and processes the first primary light to generate converted light.

The first laser set 10, a second laser set 20, and a third laser set 60 are BLDs, GLDs, and RLDs respectively. After receiving the laser light emitted by the first laser set 10, the wavelength conversion device 40 converts the laser light into yellow converted light in the second timing.

Step 73: The driving assembly drives the second laser set to emit second primary light in the first timing and the second timing.

Step 74: A light splitting assembly receives the converted light in the second timing, and splits the converted light into first converted light and second converted light.

Step 75: A light-combining assembly combines the first primary light and the second primary light in the first timing, and combines the second primary light and the converted light in the second timing.

Step 76: A light guiding assembly emits combined light of the first primary light and the second primary light in the first timing, and emits combined light of the second primary light and the first converted light and combined light of the third primary light and the second converted light in the second timing.

Step 77: The driving assembly adjusts, in the second timing, power of the second laser set and power of the third laser set based on the first converted light and the second converted light that are output in the second timing, such that the combined light of the second primary light and the first converted light and the combined light of the third primary light and the second converted light meet a preset color standard.

The driving assembly 30 drives the first laser set 10, the second laser set 20, and a third laser set 60 separately, such that the first laser set 10, the second laser set 20, and the third laser set 60 are started.

Figure 8:
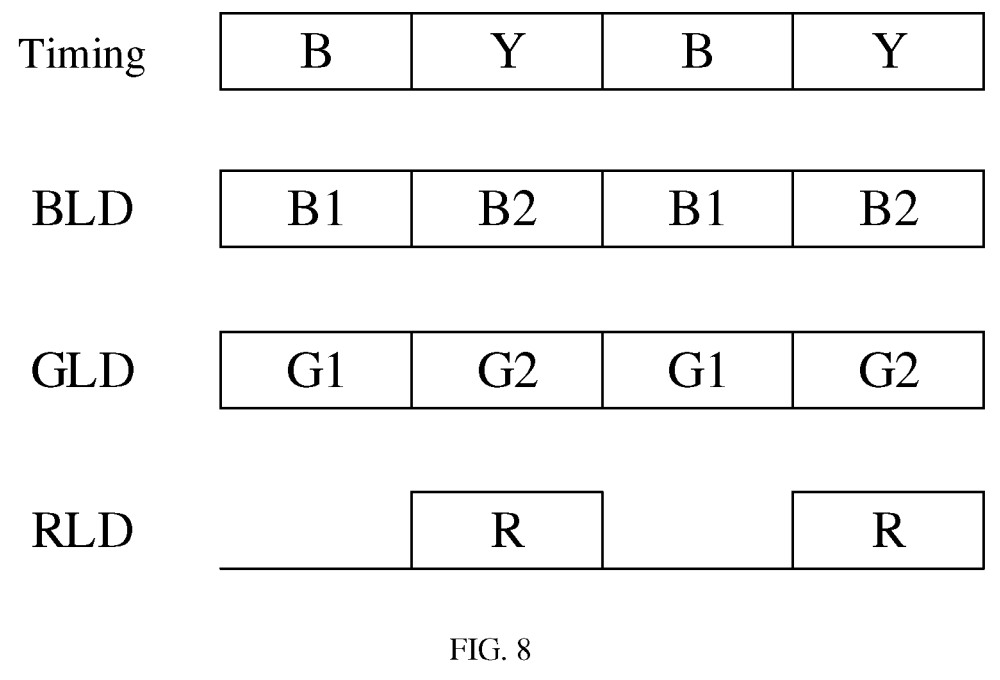

In a specific embodiment, as shown in FIG. 8, the converted light is output in a timing Y, the first primary light is output in a timing B, and the timing B and the timing Y alternate with each other. In terms of control, the driving assembly 30 can control power B1 and B2 of the Blue Laser Diode (BLD) in the timings B and Y, power G1 and G2 of the Green Laser Diode (GLD) in the timings B and Y, and power R of the RLD in the timing Y. Since the power B2 of the BLD driven by the driving assembly 30 makes a main contribution to output brightness of a projector, a rated output current is maintained for the power B2.

In the timing Y, the driving assembly 30 adjusts a driving current G2 and a driving current R that are input to the GLD and the RLD respectively, to control output brightness of the second primary light and the third primary light respectively. In this way, color coordinates of green light generated by combining green laser light and green fluorescent light meet the preset color standard, and color coordinates of red light generated by combining red laser light and red fluorescent light meet the preset color standard. Color correction can be realized for green primary light and red primary light by adjusting the driving current G2 and the driving current R.

Step 78: The driving assembly adjusts, in the first timing, power of the first laser set and the power of the second laser set, such that the combined light of the first primary light and the second primary light meets the preset color standard.

In the timing B, the driving assembly 30 adjusts a driving current B1 and a driving current G1 applied to the first laser set 10 and the second laser set 20 respectively, such that color coordinates of blue light generated by combining blue laser light and the green laser light meet the preset color standard.

Step 79: The driving assembly adjusts the power of the first laser set and the power of the second laser set at equal proportions, such that combined light of the combined light of the first primary light and the second primary light, the combined light of the second primary light and the first converted light, and the combined light of the third primary light and the second converted light meets a white balance standard.

In order to adjust white balance, since the current B1 and the current G1 need to be adjusted at the same time to ensure that color coordinates of blue primary light remain unchanged, the power input to the first laser set 10 and the power input to the second laser set 20 are adjusted at equal proportions by the driving assembly 30, such that combined light of the blue light, the green light, and the red light meets the white balance standard.

Figure 9:
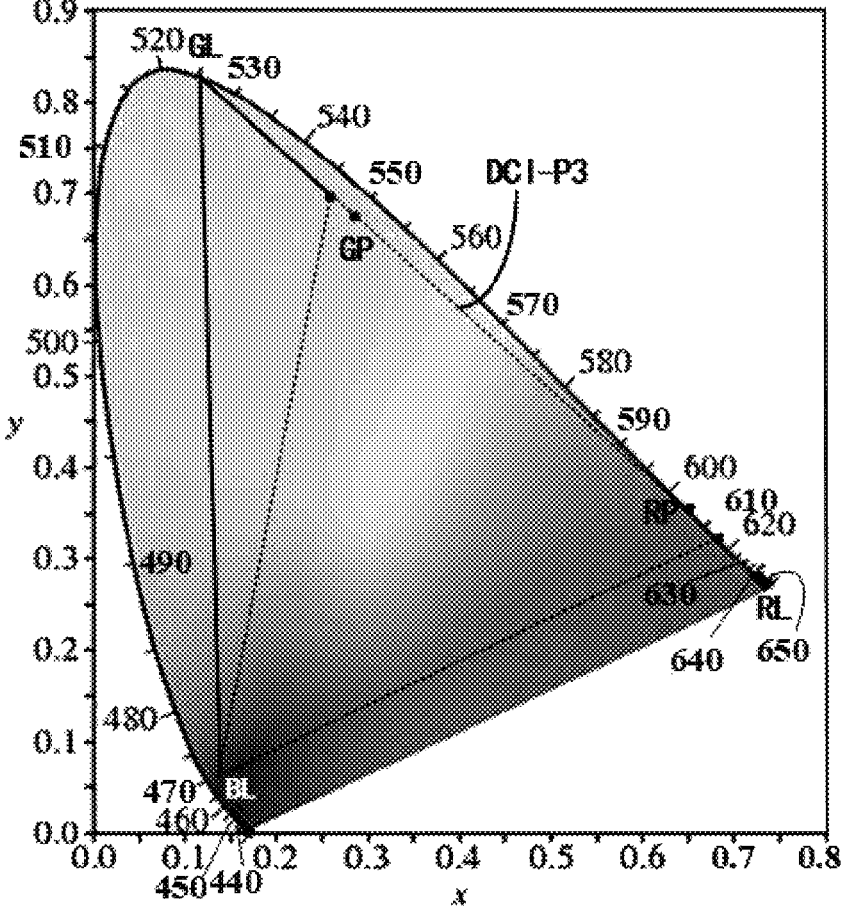
FIG. 9 is a color gamut diagram according to the present application.

In an optical-mechanical system with a two-chip spatial light modulator, there are both temporal light splitting and spatial light splitting. In the temporal light splitting, there are the timing B and the timing Y, in other words, the first laser set 10 irradiates the wavelength conversion device 40 to generate blue illumination light and yellow illumination light in time sequence. In the spatial light splitting, the yellow light is spatially divided into red illumination light and green illumination light by the light splitting assembly 70. Because spectrums of the red illumination light and the green illumination light that are obtained by splitting the yellow illumination light are wide, colors of the red illumination light and the green illumination light cannot completely meet a color standard of a movie projector. Therefore, the second laser set 20 and the third laser set 60 are added to improve a color displayed by the projector. As shown in FIG. 9, the triangle formed by dotted lines represent a DCI-P3 color gamut, where RP and GP are color coordinates of the red light and the green light that are obtained by splitting the yellow illumination light, respectively, and RL, GL and BL are color coordinates of laser light emitted from the red laser light, the green laser light, and the blue laser light respectively. It can be seen from FIG. 9 that the color coordinates GP of the green fluorescent light and the color coordinates RP of the red fluorescent light are not on any angle of the triangle, and the color coordinates BL of the blue laser light also deviate a lot from an angle. Therefore, the green primary light can be corrected by mixing the color coordinates GL of the green laser light and the color coordinates GP of the green fluorescent light, the red primary light can be corrected by mixing the color coordinates RL of the red laser light and the color coordinates RP of the red fluorescent light, and the blue primary light can be corrected by mixing of the color coordinates BL of the blue laser light and the color coordinates GL of the green laser light, thereby improving utilization efficiency of the green laser light.

After the light guiding assembly 80 outputs the light, the spatial light modulator 90 is used to modulate, based on a received image signal, the light output by the light guiding assembly 80, and transmit modulated light to the projection lens 100 for projection imaging.

A projector with a two-chip spatial light modulator is used to support both the temporal light splitting and the spatial light splitting. Based on a basic light combination principle of laser light and fluorescent light, color correction is realized through timing-based adjustment by using a driving power supply. A color standard of the projector has a large tolerance for the three primary colors and strict white balance. A primary color is pre-corrected by using laser light, and then the white balance is accurately corrected by adjusting the laser light, such that white light meets the white balance standard, and the three primary colors also meet the preset color standard.

The solution in this embodiment can be applied to the movie projector or a laser television. For the projector with two spatial light modulators 90, the color displayed by the projector can be adjusted through control and adjustment by the driving assembly 30, and light output is not affected. In this way, the color displayed by the projector can be corrected, and the three primary colors and white balance of the projector can be corrected without losing brightness and sacrificing a gray scale. The solution can also be applied to a laser television, an engineering machine, a cinema light source, or the like.

Referring to FIG. 3 and FIG. 10, FIG. 10 is a schematic flowchart of a color correction method for a lighting system according to a fourth embodiment of the present application. The method includes the following steps.

Step 101: A driving assembly drives a first laser set to emit first primary light in a first timing and a second timing.

Step 102: A wavelength conversion device receives, in the second timing, the first primary light emitted by the first laser set, and processes the first primary light to generate converted light.

Step 103: The driving assembly drives a second laser set to emit second primary light in the first timing and the second timing.

Step 104: A light splitting assembly receives the converted light in the second timing, and splits the converted light into first converted light and second converted light.

Step 105: A light-combining assembly combines the first primary light and the second primary light in the first timing, and combines the second primary light and the converted light in the second timing.

Step 106: A light guiding assembly emits combined light of the first primary light and the second primary light in the first timing, and emits combined light of the second primary light and the first converted light and combined light of the third primary light and the second converted light in the second timing.

Step 107: The driving assembly drives the first laser set, adjusts, in the second timing, power of the second laser set and power of a third laser set based on the first converted light and the second converted light that are output in the second timing sequence, such that the combined light of the second primary light and the first converted light and the combined light of the third primary light and the second converted light meet a preset color standard, and determines, when the combined light of the second primary light and the first converted light and the combined light of the third primary light and the second converted light meet the preset color standard, a first adjustment range of power of the second laser set in the second timing, a first adjustment range of power of the third laser set in the second timing, and a second adjustment range of power of the second laser set in the first timing.

In a specific embodiment, as shown in FIG. 8 and FIG. 9, the driving assembly 30 first drives a BLD to obtain color coordinates BL of blue laser light, color coordinates GP of green fluorescent light, and color coordinates RP of red fluorescent light. Then the driving assembly 30 drives a GLD and an RLD. Adjustment ranges of a driving current G1, a driving currents G2, and a driving current R are determined according to the DCI-P3 standard and the principle of tristimulus values. Blue primary light is calibrated, and red primary light and green primary light are pre-calibrated, such that they meet the DCI-PC standard.

Step 108: The driving assembly adjusts power of the first laser set in the first timing and the power of the second laser set in the first timing at equal proportions, such that combined light of the combined light of the first primary light and the second primary light, the combined light of the second primary light and the first converted light, and the combined light of the third primary light and the second converted light meets a white balance standard, and adjusts the power of the second laser set in the second timing and the power of the third laser set in the second timing within the first adjustment range, such that the combined light of the first primary light and the second primary light, the combined light of the second primary light and the first converted light, and the combined light of the third primary light and the second converted light meet the preset color standard.

When white light color balance is finally calibrated, a driving current B1 and the driving current G1 are modulated in the same proportion. In addition, the driving current G1 is adjusted within the second adjustment range to make color coordinates of the blue primary light unchanged, and the driving current G2 and the driving current R are adjusted within the first adjustment range to make the white balance meet the DCI-P3 standard. Since more variables are introduced to calibrate the white balance, white light can be corrected more accurately. In a DCI-P3 color standard of a projector, a tolerance range of three primary colors is wide and a tolerance range of the white light is narrow. Therefore, this embodiment ensures that the three primary colors meet a projection standard while accurately calibrating the white balance.

Referring to FIG. 11, FIG. 11 is a schematic flowchart of a color correction method for a lighting system according to a fifth embodiment of the present application. The method includes the following steps.

Step 111: A driving assembly drives a first laser set to emit first primary light in a first timing and a second timing.

The laser set 10 includes a first unit 11 and a second unit 12. The first unit 11 generates laser light to excite a wavelength conversion device 40 to generate yellow light. The second unit 12 generates blue illumination light that meets a standard for blue light in DCI-P3. For example, for a laser with a wavelength of 465 nm, a wavelength of the second unit 12 is not limited to this wavelength, and may alternatively be 464 nm, 466 nm, or 467 nm.

The driving assembly 30 drives four lasers separately, and the first primary laser light emitted by the second unit 12 in the first timing is incident into a light splitting assembly 70 through a light-combining assembly 50. Specifically, after receiving, in the first timing, laser light emitted by the second unit 12, a second reflection and transmission assembly 52 reflects the laser light to the light splitting assembly 70. After receiving, in the second timing, the first primary laser light emitted by the first unit 11, the wavelength conversion device 40 converts the laser light into converted light.

Step 112: The wavelength conversion device receives, in the second timing, the first primary light emitted by the first laser set, and processes the first primary light to generate the converted light.

Step 113: The driving assembly drives a second laser set to emit second primary light in the first timing and the second timing.

Step 114: The light splitting assembly receives the converted light in the second timing, and splits the converted light into first converted light and second converted light.

Step 115: The light-combining assembly combines the first primary light and the second primary light in the first timing, and combines the second primary light and the converted light in the second timing.

Step 116: A light guiding assembly emits combined light of the first primary light and the second primary light in the first timing, and emits combined light of the second primary light and the first converted light and combined light of the third primary light and the second converted light in the second timing.

Step 117: The driving assembly drives the first unit in the second timing, adjusts power of the second laser set and power of a third laser set based on the second converted light and the third converted light, such that the combined light of the second primary light and the first converted light and the combined light of the third primary light and the second converted light meet a preset color standard, and determines, when the combined light of the second primary light and the first converted light and the combined light of the third primary light and the second converted light meet the preset color standard, a first adjustment range of power of the second laser set in the second timing and a first adjustment range of power of the third laser set in the second timing.

Figure 12:
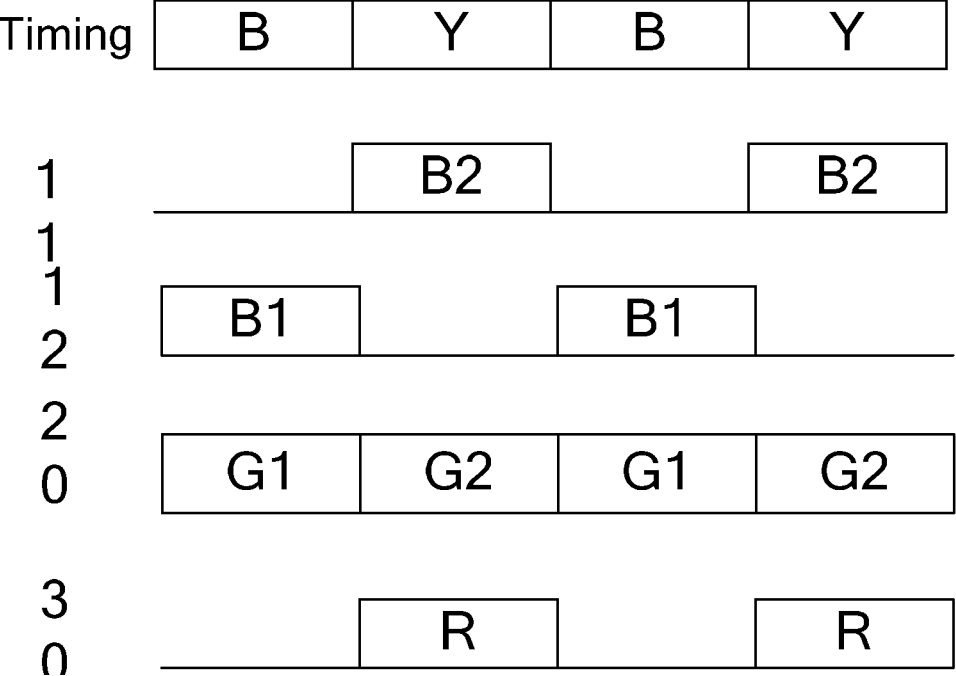
FIG. 12 is a schematic diagram of a timing and a driving current in the embodiment shown in FIG. 11.

In a specific embodiment, as shown in FIG. 9 and FIG. 12, the driving assembly 30 first drives a BLD to obtain color coordinates GP of green fluorescent light and color coordinates RP of red fluorescent light. Then, adjustment ranges of a driving current G and a driving current R are determined according to the DCI-P3 standard and the principle of tristimulus values. Red primary light and green primary light are pre-calibrated, such that they meet the DCI-PC standard.

Step 118: The driving assembly adjusts, in the first timing, power of the second unit, such that the combined light of the first primary light and the second primary light meets the preset color standard, and adjusts power of the second laser set in the first timing sequence and power of the third laser set in the first timing sequence within the first adjustment range, such that the combined light of the first primary light and the second primary light, the combined light of the second primary light and the first converted light, and the combined light of the third primary light and the second converted light meet a white balance standard.

When white light color balance is finally calibrated, the driving assembly 30 drives the second unit 12, such that the second unit 12 is started. A driving current B1 is adjusted, the driving current G and the driving current R are adjusted within the first adjustment range, and calibrated white light meets the DCI-P3 standard.

The solutions in the present application can be applied to the field of cinema projectors. Primary light is formed by mixing laser light and fluorescent light. Therefore, a proportional relationship between the laser light and the fluorescent light can be adjusted by adjusting a drive of a laser, so as to correct a primary color. In addition, power of the laser light can be controlled in time sequence, and an output of the primary light can be controlled, so as to correct white light color balance to the standard of a DCI-P3 color gamut, thereby avoiding a brightness loss of a projector and sacrifice of a gray scale.

In several implementations provided in the present application, it should be understood that the disclosed method and device may be implemented in other manners. For example, the described implementations of the devices are merely provided schematically. For example, the division of modules or units merely refers to logical function division, and there may be other division manners in actual implementation. For example, a plurality of units or components may be combined or integrated into another system, or some features may be ignored or not executed.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions in the implementations.

In addition, functional units in the implementations of the present application may be integrated into one processing unit, or each of the units may exist alone physically, or two or more units may be integrated into one unit. The above integrated unit may be implemented either in a form of hardware or in a form of a software functional unit.

The above described are merely embodiments of the present application, which do not constitute a limitation on the scope of the patent of the present application. Any equivalent structure or equivalent process change made based on the description and drawings of the present application, or direct or indirect application thereof in other related technical fields, should still fall in the protection scope of the patent of the present application.

What is claimed is:

1. A lighting system, comprising at least:

a first laser set, configured to emit first primary light;

a second laser set, configured to emit second primary light;

a driving assembly, configured to drive the first laser set to emit the first primary light in a first timing and in a second timing, and drive the second laser set to emit the second primary light in the first timing and in the second timing;

a wavelength conversion device, configured to convert the first primary light into converted light in the second timing; and a light-combining assembly, configured to combine the first primary light and the second primary light in the first timing, and combine the second primary light and the converted light in the second timing.

2. The lighting system according to claim 1, wherein the driving assembly adjusts an optical power of the second laser set respectively in the first timing and in the second timing, such that power of the second primary light emitted in the first timing is different from power of the second primary light emitted in the second timing.

3. The lighting system according to claim 1, further comprising a third laser set, a light splitting assembly, and a light guiding assembly, wherein the third laser set is configured to generate third primary light, and the light splitting assembly receives the converted light in the second timing and splits the converted light into first converted light and second converted light;

the light guiding assembly emits combined light of the first primary light and the second primary light in the first timing, and emits combined light of the second primary light and the first converted light and emits combined light of the third primary light and the second converted light in the second timing; and the driving assembly adjusts, in the first timing and in the second timing, power of the first laser set, power of the second laser set, and power of the third laser set based on the first converted light and the second converted light, such that the combined light output from the light guiding assembly meets a preset color standard and a white balance standard.

4. The lighting system according to claim 3, wherein the first laser set comprises a first unit and a second unit, wherein the first unit and the second unit are respectively configured to generate the first primary light in the first timing and in the second timing, and the first primary light emitted by the first unit has a different wavelength range from the first primary light emitted by the second unit.

5. The lighting system according to claim 3, further comprising at least two spatial light modulators arranged on an optical path of the combined light output from the light guiding assembly, and a projection lens, wherein each of the at least two spatial light modulators is configured to modulate, based on a received image signal, the light output by the light guiding assembly, and transmit modulated light to the projection lens for projection imaging.

6. The lighting system according to claim 1, wherein the first laser set, the second laser set, and the third laser set are blue laser diodes, green laser diodes, and red laser diodes respectively, and the converted light is yellow light.

7. A method for correcting colors of a lighting system, wherein the method is applied to a lighting system, wherein the lighting system comprises at least a first laser set, a second laser set, a wavelength conversion device, a driving assembly, and a light-combining assembly, and the method is based on the driving assembly, and comprises:

driving, by the driving assembly, the first laser set to emit first primary light in a first timing and in a second timing;

converting, by the wavelength conversion device, the first primary light into converted light in the second timing;

driving, by the driving assembly, the second laser set to emit second primary light in the first timing and in the second timing; and combining, by the light-combining assembly, the first primary light and the second primary light in the first timing, and combining the second primary light and the converted light in the second timing.

8. The method according to claim 7, wherein the lighting system further comprises a third laser set, a light splitting assembly, and a light guiding assembly, wherein the third laser set is configured to generate third primary light, and the method comprises:

receiving, by the wavelength conversion device in the second timing, the first primary light emitted by the first laser set, and processing the first primary light to generate the converted light;

receiving, by the light splitting assembly, the converted light in the second timing, and splitting the converted light into first converted light and second converted light;

emitting, by the light guiding assembly, combined light of the first primary light and the second primary light in the first timing, combined light of the second primary light and the first converted light, and combined light of the third primary light and the second converted light in the second timing; and adjusting, by the driving assembly in the first timing and in the second timing, power of the first laser set, power of the second laser set, and power of the third laser set based on the first converted light and the second converted light, such that combined light output from the light guiding assembly meets a preset color standard and a white balance standard.

9. The method according to claim 8, wherein said adjusting, by the driving assembly in the first timing and in the second timing, the power of the first laser set, the power of the second laser set, and the power of the third laser set based on the first converted light and the second converted light comprises:

adjusting, by the driving assembly in the second timing, the power of the second laser set and the power of the third laser set based on the first converted light and the second converted light that are output in the second timing, such that the combined light of the second primary light and the first converted light and the combined light of the third primary light and the second converted light meet the preset color standard;

adjusting, by the driving assembly in the first timing, the power of the first laser set and the power of the second laser set, such that the combined light of the first primary light and the second primary light meets the preset color standard; and adjusting, by the driving assembly, the power of the first laser set and the power the second laser set at equal proportions, such that combined light of the combined light of the first primary light and the second primary light, the combined light of the second primary light and the first converted light, and the combined light of the third primary light and the second converted light meets the white balance standard.

10. The method according to claim 8, wherein said adjusting, by the driving assembly in the first timing and in the second timing, the power of the first laser set, the power of the second laser set, and the power of the third laser set based on the first converted light and the second converted light comprises:

driving, by the driving assembly in the second timing, the first laser set to adjust the power of the second laser set and the power of the third laser set based on the first converted light and the second converted light that are output in the second timing, such that the combined light of the second primary light and the first converted light and the combined light of the third primary light and the second converted light meet the preset color standard; and determining, when the combined light of the second primary light and the first converted light and the combined light of the third primary light and the second converted light meet the preset color standard, a first adjustment range of power of the second laser set in the second timing, a first adjustment range of power of the third laser set in the second timing, and a second adjustment range of power of the second laser set in the first timing; and adjusting, by the driving assembly, the power of the first laser set in the first timing and the power of the second laser set in the first timing at equal proportions, such that combined light of the combined light of the first primary light and the second primary light, the combined light of the second primary light and the first converted light, and the combined light of the third primary light and the second converted light meets the white balance standard; and adjusting the power of the second laser set in the second timing and the power of the third laser set in the second timing within the first adjustment range, such that the combined light of the first primary light and the second primary light, the combined light of the second primary light and the first converted light, and the combined light of the third primary light and the second converted light meet the preset color standard.

11. The method according to claim 8, wherein the first laser set comprises a first unit and a second unit, the wavelength conversion device converts the first primary light into the converted light after receiving the first primary light in the second timing, and the first primary light emitted by the second unit in the first timing enters the light splitting assembly through the light-combining assembly.

12. The method according to claim 11, wherein said adjusting, by the driving assembly in the first timing and in the second timing, the power of the first laser set, the power of the second laser set, and the power of the third laser set based on the first converted light and the second converted light comprises:

driving, by the driving assembly, the first unit in the second timing, to adjust the power of the second laser set and the power of the third laser set based on the second converted light and the third converted light, such that the combined light of the second primary light and the first converted light and the combined light of the third primary light and the second converted light meet the preset color standard; and determining, when the combined light of the second primary light and the first converted light and the combined light of the third primary light and the second converted light meet the preset color standard, a first adjustment range of power of the second laser set in the second timing and a first adjustment range of power of the third laser set in the second timing; and adjusting, by the driving assembly in the first timing, power of the second unit, such that the combined light of the first primary light and the second primary light meets the preset color standard; and adjusting the power of the second laser set in the first timing and the power of the third laser set in the first timing within the first adjustment range, such that combined light of the combined light of the first primary light and the second primary light, the combined light of the second primary light and the first converted light, and the combined light of the third primary light and the second converted light meets the white balance standard.

* * * * *